United States Patent [19]

Barnett et al.

[11] Patent Number: 5,708,496
[45] Date of Patent: Jan. 13, 1998

[54] MODULAR OPTICAL SHAFT ENCODER HAVING A SLIDE GAP CENTERING MECHANISM AND METHOD OF USE

[75] Inventors: Donald E. Barnett, Solvang; Robert M. Setbacken; Kevin M. Carbone, both of Santa Barbara, all of Calif.

[73] Assignee: Renco Encoders, Inc., Goleta, Calif.

[21] Appl. No.: 707,990

[22] Filed: Mar. 11, 1996

[51] Int. Cl.$^6$ .................................. G01D 5/34; G01P 3/36
[52] U.S. Cl. .................. 356/28; 250/231.13; 250/231.16; 250/239
[58] Field of Search .......................... 250/231.16, 231.13, 250/239; 340/870.29; 356/28, 151, 243, 399

[56] References Cited

U.S. PATENT DOCUMENTS

| | | |
|---|---|---|
| 4,184,071 | 1/1980 | Fryer et al. . |
| 4,285,595 | 8/1981 | Fryer et al. . |
| 4,375,592 | 3/1983 | Cox et al. ........................ 250/231 SE |
| 4,475,034 | 10/1984 | Maddox et al. . |
| 4,794,250 | 12/1988 | Togami . |
| 4,982,084 | 1/1991 | Ushiyama et al. ................. 250/231.14 |
| 5,057,684 | 10/1991 | Service . |

OTHER PUBLICATIONS

BEI Motion Systems Company Technical Brochure, "MX21 Insta--Mount Series Modular Incremental Rotary Optical Encoder", 1989.

Design News, McCarty, Lyle H., "Encoder Provides Commutation and Position Feedback", Mar. 27, 1989, pp. 256–257.

Hewlett Packard Technical Brochure, "Quick Assembly Optical Encoder", HEDS--5500 Series, Jun. 1987.

Machine Design, "Twist, Snap, Twist, Twist. An Encoder with A Difference", Aug. 20, 1987 p. 45.

Primary Examiner—Mark Hellner
Attorney, Agent, or Firm—Faegre & Benson

[57] ABSTRACT

A simplified mechanism for rotationally aligning and gapping a pattern wheel with respect to a stationary mask are provided as part of a modular optical shaft encoder in accordance with the present invention. Moreover, the present invention includes a simplified method of connecting and aligning a modular encoder to a shaft. A radial alignment mechanism is provided between engagement surfaces of the hub of the pattern wheel and the encoder housing for independently providing radial alignment. The engagement surfaces are designed so that as the surfaces are urged into engagement with one another, the encoder housing (and thus the mask pattern) becomes radially aligned to the pattern wheel (and specifically its pattern). As an independent functional mechanism, a linear cam member is utilized for gapping the hub of the pattern wheel and thus the pattern thereon to the stationary mask pattern. The method of the present invention includes steps for independently radially aligning the optical pattern of the pattern wheel to the mask pattern of the mask and for separately gapping the pattern wheel with respect to the mask.

21 Claims, 6 Drawing Sheets

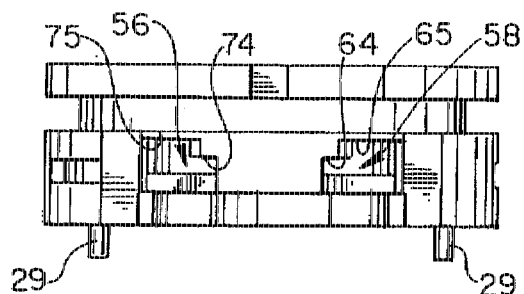
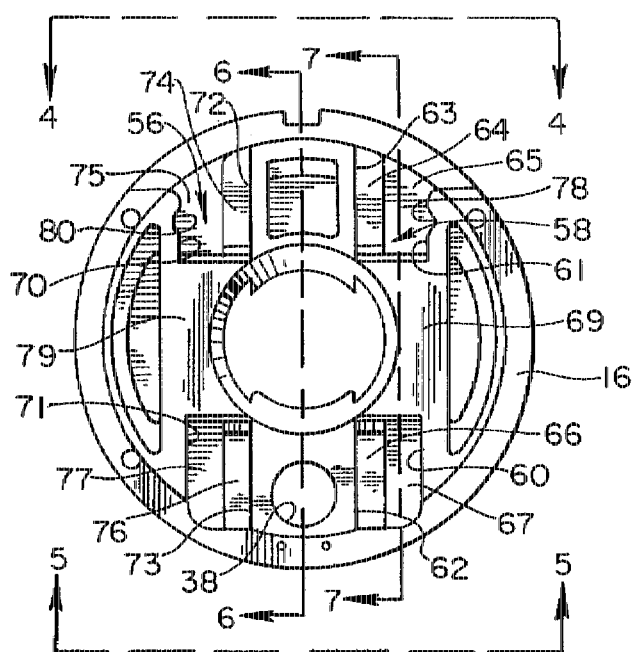
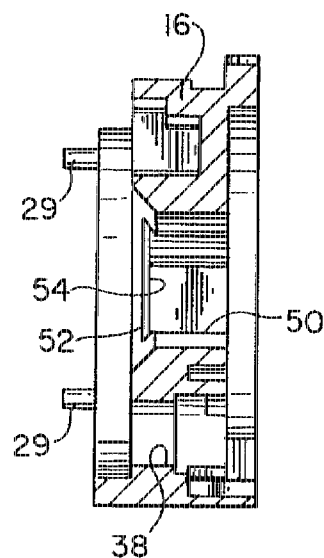
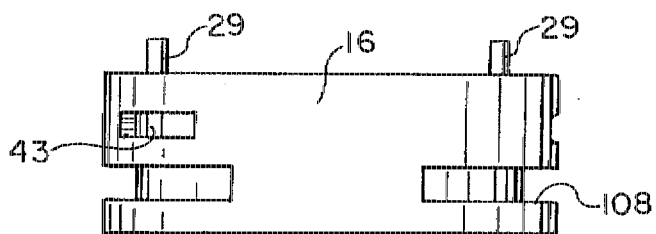

MODULAR OPTICAL SHAFT ENCODER HAVING A SLIDE GAP CENTERING MECHANISM AND METHOD OF USE

TECHNICAL FIELD

The present invention is directed to a modular optical shaft encoder that is usable for detecting and converting various aspects of the rotation of a rotatable shaft into electronic signals, and in particular to a modular encoder having simpler mechanisms for radially aligning and axially aligning a pattern wheel to the proper orientation with respect to the encoder optics.

BACKGROUND OF THE INVENTION

Modular shaft encoders have been developed for tracking shaft information, including shaft position, velocity, and direction of rotation, and providing an electrical feedback of such information. One specific type is the optical shaft encoders having a light source and a photodetector, between which a pattern wheel rotates as connected with the monitored shaft. A mask is also typically provided between the pattern wheel and the photodetector and is non-rotationally mounted. Light pulses selectively pass through both the pattern wheel and the mask and are converted into electronic signals by the photodetector in accordance with the manner in which the light pulses are received. The electronic signals are utilized for determining information about the rotation of the pattern wheel, and hence, the shaft.

Within modular encoders, the pattern wheel is rotatably mounted to the shaft being monitored. The mask is non-rotationally mounted to the encoder housing to be positioned between the pattern wheel and the photodetector. The encoder optics must be properly oriented. Specifically, the pattern of the pattern wheel must be aligned with respect to the stationary mask pattern, within allowable tolerances, to reduce errors. Alignment includes, proper radial alignment so that the pattern of the pattern wheel is concentric to the stationary mask pattern. Moreover, the axial location of the pattern wheel with respect to the stationary mask pattern must be accurately positioned. The pattern wheel is preferably provided within a predetermined range, for example with an elevation or gap of between 0.01–0.02 inch from the stationary mask in order to minimize cross-talk and phase errors. A minimum gap, however, is necessary in order to accommodate minor wheel wobble and other minor movements.

In U.S. Pat. No. 5,057,684 to Service, an apparatus and method is disclosed for centering a pattern wheel within a modular optical shaft encoder and for setting a predetermined gap distance between the pattern wheel and stationary mask. The apparatus includes a slideable linear cam which cooperates with a centering collar which is axially moveable for centering the pattern wheel and gapping the pattern wheel to the mask. The advantage of this system is that both the axial alignment and gap can be controlled together by the movement of a single linear cam. However, the construction requires the additional centering collar.

Other modular optical shaft encoders are disclosed in U.S. Pat. No. 4,475,034 to Maddox et al., and U.S. Pat. No. 4,794,250 to Togami. In each case, means are provided for rotationally aligning the pattern wheel and gapping the pattern wheel relative to a stationary mask. Moreover, in both cases, rotational movement of one specific element, such as a housing or cover, is necessary to provide a rotary cam action for gapping and releasing the pattern wheel for rotational movement after mounting.

SUMMARY OF THE INVENTION

A simplified mechanism for rotationally aligning and gapping a pattern wheel with respect to a stationary mask are provided as part of a modular optical shaft encoder in accordance with the present invention. Moreover, the present invention includes a simplified method of connecting and aligning a modular encoder to a shaft.

In accordance with the present invention, a radial alignment mechanism is provided between engagement surfaces of the hub of the pattern wheel and the encoder housing for independently providing radial alignment. The engagement surfaces are designed so that as the surfaces are urged into engagement with one another, the encoder housing (and thus the mask pattern) becomes radially aligned to the pattern wheel (and specifically its pattern). As an independent functional mechanism, a linear cam member is utilized for gapping the hub of the pattern wheel and thus the pattern thereon to the stationary mask pattern.

More particularly, the modular optical shaft encoder of the present invention includes an encoder housing for connection to the supporting structure of the rotatable shaft so as to be non-rotatably mounted relative to the shaft and having an opening through which the shaft extends when connected to the supporting structure. The encoder housing includes an engagement surface comprising a radial alignment sloped surface extending at least partially around its opening. A light source and a photodetector are connected to the encoder housing so as to be non-rotatably mounted with the supporting structure relative to the shaft. A mask having a mask pattern is positioned axially between the light source and the photodetector and is also connected to the encoder housing so as to be non-rotatably mounted with the supporting structure relative to the shaft. The modular encoder of the present invention also includes a pattern wheel and hub assembly having an axial passage for slideably receiving the shaft and for mounting the hub to the shaft. The pattern wheel has a radially extending surface having an optical pattern thereon which is axially positioned between the light source and the mask. The hub is further provided with an engagement surface preferably comprising a radial alignment sloped surface extending at least partially around the axial passage thereof and is positioned to engage with the radial alignment surface of the encoder housing. As a result, when the encoder housing is unconnected to the supporting structure of the rotatable shaft but positioned with the rotatable shaft extending through its opening and the hub of the pattern wheel is slideably provided on the rotatable shaft, and further when the hub is moved along the shaft toward the encoder housing, the radial alignment sloped surfaces of the encoder housing and the hub of the pattern wheel will engage one another to cause radial alignment of the optical pattern of the pattern wheel to the mask pattern of the mask.

According to another aspect of the present invention, the modular encoder includes at least one transverse passage within the encoder housing that opens into its axial opening, and the encoder further includes a linear cam element having a platform portion which is movably disposed within the transverse passage of the encoder housing between a first position in which the platform is positioned within the transverse passage but out of the opening of the encoder housing so that the engagement surfaces of the hub and the encoder housing can contact one another and a second position in which at least a part of the platform portion extends within the axial opening of the encoder housing for engagement with the hub so as to space the engagement surfaces of the hub and the encoder housing from one another.

Additionally, the method of the present invention includes steps for mounting and aligning a modular encoder to a rotatable shaft of the type having a supporting structure, wherein the encoder has an encoder housing with an axial opening and a radial alignment sloped surface extending at least partially around the opening, a light source connected to the encoder housing, a photodetector axially spaced from the light source and connected to the encoder housing, a mask having a mask pattern, the mask positioned axially between the light source and the photodetector, and a pattern wheel including a hub having an axial passage and a radially extending surface having an optical pattern thereon. The radially extending surface thereof being axially positioned between the light source and the mask and the hub having a radial alignment sloped surface extending at least partially around the axial passage and positioned to engage with the radial alignment surface of the encoder housing. The steps include positioning the modular encoder on the rotatable shaft with the shaft extending through the axial opening of the encoder housing and the axial passage of the hub. Urging the hub and encoder housing toward the supporting structure of the rotatable shaft and engaging the radial alignment surfaces of the encoder housing and the hub with one another and thereby causing radial alignment of the optical pattern of the pattern wheel to the mask pattern of the mask. Then, mounting the encoder housing to the supporting structure of the rotatable shaft with the optical pattern of the pattern wheel radially aligned to the mask pattern of the mask. In order to then properly axially gap the pattern wheel with respect to the mask, after the step of mounting the encoder housing, the hub is moved away from the encoder body by a predetermined distance and connected to the rotatable shaft to be rotatable therewith at the predetermined distance. Preferably, the gapping step is accomplished by moving a linear cam element between first and second positions within a transverse passage that is provided within the encoder body and is open to the axial opening thereof, wherein the linear cam element includes a platform which is moved from a position within the transverse passage but out of the axial opening to a position at least partially within the axial opening as the linear cam element is moved from its first position to its second position.

BRIEF DESCRIPTION OF THE DRAWINGS

FIG. 8 is a top plan view of a linear cam in accordance with the present invention;

FIG. 9 is a right side elevational view of the linear cam of FIG. 8;

FIG. 10 is an end view in elevation of the linear cam of FIG. 8;

FIG. 11 is a perspective view of the linear cam;

DETAILED DESCRIPTION OF THE PREFERRED EMBODIMENTS

Figure 1:
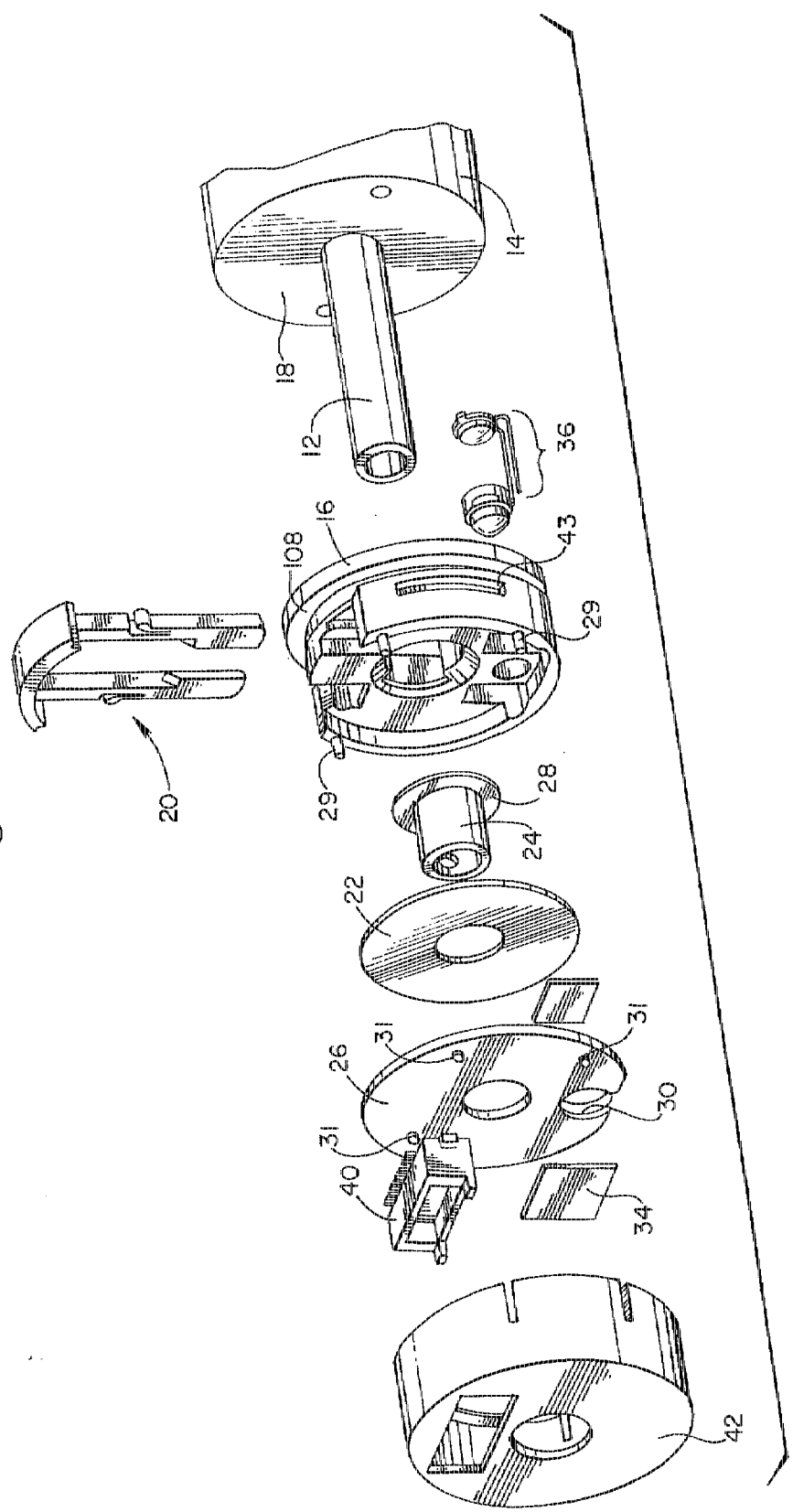
FIG. 1 is an exploded perspective view of the modular optical shaft encoder of the present invention in position for placement on a motor shaft.

Referring now to the drawings, wherein like components are designated with like numerals throughout the several Figures, a modular optical shaft encoder 10 is shown in FIG. 1 in exploded view for attachment to a shaft 12 of a motor 14. It is understood that shaft 12 merely represents a type of shaft to which the present invention can be mounted and that a motor 14 comprises one example. Encoder 10 can be mounted to any existing shaft 12 as long as a mounting surface is provided about the shaft 12 for rotationally fixing encoder housing 16. As shown, motor 14 includes a mounting surface 18.

The modular encoder 10 of the present invention basically comprises the encoder housing 16, a linear cam 20, a pattern wheel 22 fixed with a hub 24, and a circuit board 26. The pattern wheel 22 is preferably conventionally fixed with the hub 24 against a flange portion 28 thereof, such as by adhesive or the like. Hub 24, as described below, is to be rotationally fixed with the shaft 12 so that the pattern wheel 22 rotates with the shaft 12. Pattern wheel 22 includes a specific pattern coded on at least one surface thereof as conventionally known.

In accordance with the illustrated example, the circuit board 26 mounts to the top surface of the encoder housing 16 to be stationary therewith and includes an opening 30. Pins 29 extending from the top surface of the encoder housing 16 preferably are provided to cooperate with holes 31 through the circuit board 26 to facilitate proper alignment. A mask 32 having a pattern coded thereon is mounted to the side of circuit board 26 facing the pattern wheel 22 and covering the opening 30. A photodetector assembly 34 is mounted to the opposite surface of the circuit board 26 also over the opening 30. A light source 36 is mounted within the encoder housing 16, as will be detailed further below, so that light emitted thereby passes through a passage 38 of the encoder housing 16, through any aligned transparent portions of the patterns of the pattern wheel 22 and the mask 32, and through the opening 30 of the circuit board 26 to be received by the photodetector assembly 34. The photodetector assembly 34 and the light source 36 can be any conventional components as are presently known or hereinafter developed. Mask 32 is preferably provided with a specific mask pattern so that between the moveable pattern on the pattern wheel 22 and the fixed pattern on the mask 32, specific light pulses can be detected by the photodetector 34, as is well-known, in order to provide specific information about the rotation and position of shaft 12.

Appropriate electronic components, such as the illustrated connector 40, for example, are mounted to the photodetector side of the circuit board 26 and are conventionally used for processing the electronic signals from the photodetector 34 and providing the tracking information of shaft 12. A cover 42 is preferably provided to eliminate the effects of outside light and is removably fixed to the encoder housing 16, such as by a plurality of protuberances (not shown) on the inside circumference of the cover 42 for snap fit engaging within corresponding grooves 43 provided about the outer circumference of the encoder housing 16.

It is understood that the above-described configuration is but one possible configuration of the printed circuit board 26, photodetector 34, mask 32 and light source 36. Any configuration is contemplated having a rotatable pattern wheel with a rotationally fixed mask. The light source can be supported instead by the printed circuit board with the mask and photodetector mounted within the encoder housing, as another example.

Figure 13:
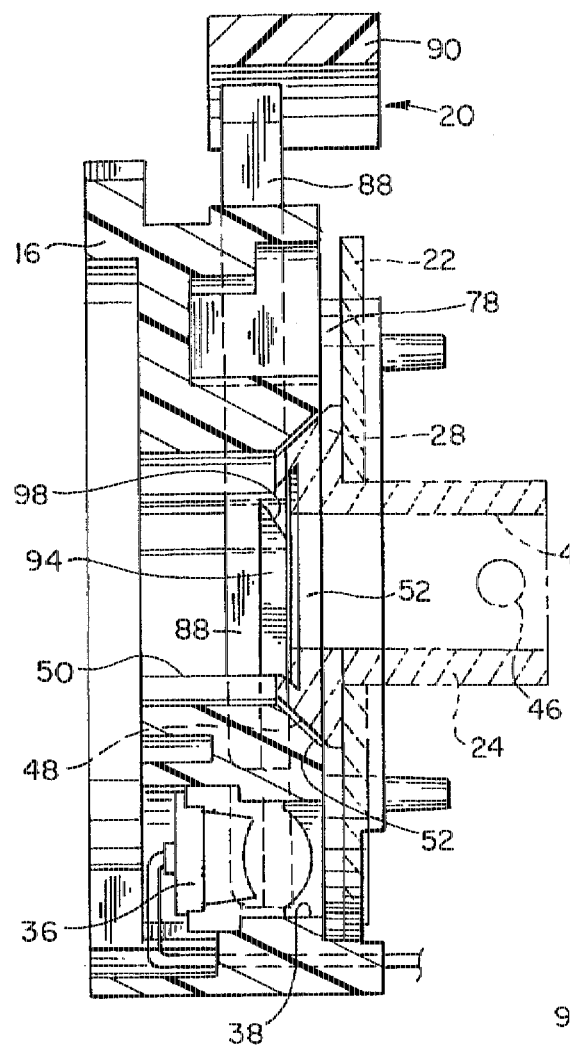
FIG. 13 is a view similar to FIG. 12 but with the linear cam in its second position so that its platform portion is positioned for supporting the bottom surface of the hub for setting a gap between the engagement surface of the encoder housing and the engagement surface of the hub to thereby gap the pattern wheel relative to the stationary mask.
Figure 12:
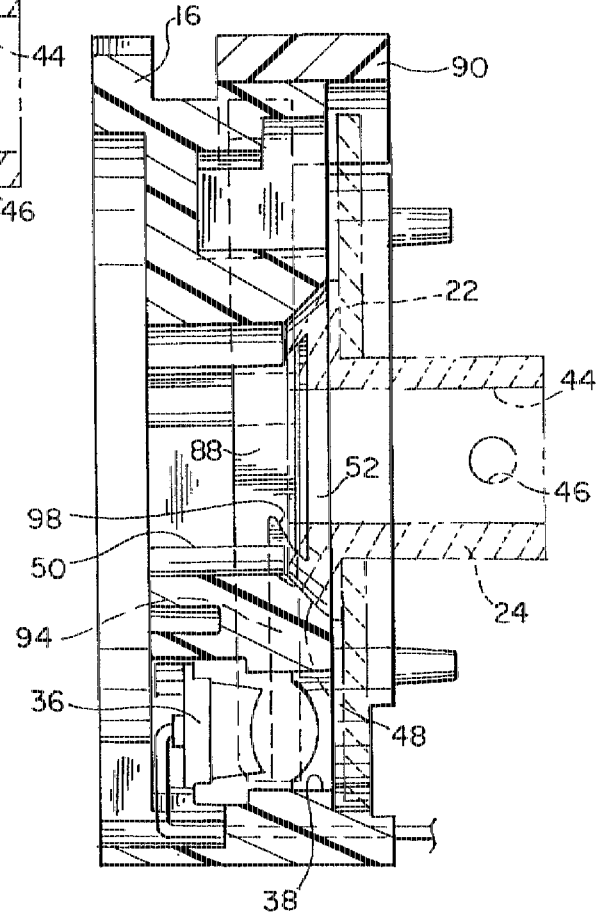
FIG. 12 is a cross-sectional view taken through a partial assembly of the modular optical shaft encoder of the present invention including the encoder housing and the linear cam, the pattern wheel and hub assembly being shown in phantom, with the linear cam in a first position so that the engagement surface of the encoder housing can contact the engagement surface of the hub.

With reference to FIG. 1 and the partially assembled construction shown in FIGS. 12–15, hub 24 includes an axial passage 44 which is preferably sized to be slideable along shaft 12 to which the encoder 10 is to monitor. The hub 24 is to be rotationably mounted to the shaft 12, such as by a set screw (not shown) provided within a threaded hole 46 through the side wall of hub 24, as conventionally known for securing a hub to a shaft. The steps of the mounting process for mounting and aligning the pattern wheel 22 with respect to the encoder housing 16 will be described below. Below the flange portion 28 of the hub 24, a sloped surface 48 is provided, which as seen in FIGS. 12 and 13, forms a truncated cone at the bottom of hub 24. The sloped surface 48 provides an engagement surface of the hub 24 for cooperatively interacting with an engagement surface of the encoder housing 16, described below. It is noted that the sloped surface 48 need not comprise a flat surface itself (as viewed in cross-section), but could be a simple or complex curve, or could comprise a series of small stepped surfaces, so long as the aligning affect described below can be accomplished by cooperation with the engagement surface of the encoder housing 16.

Referring now to FIGS. 2–7, details of the encoder housing 16 are described. A central opening 50 is provided extending axially through the encoder housing 16 to permit the passage of shaft 12 therethrough without interference when the encoder housing 16 is non-rotationally secured to the mounting surface 18. A conical sloped surface 52 preferably surrounds the central axial opening 50. More preferably, the slope of the conical surface 52 is preferably similar to the slope of sloped surface 48 of the hub 24. Thus, when the sloped surface 48 of hub 24 is positioned or urged against the conical sloped surface 52 of housing 16, the interaction will cause the hub 24 and housing 16 to be radially aligned with one another, the purpose of which will be described below in the method of mounting the encoder 10. Likewise as with the sloped surface 48 of the hub 24, the sloped surface 52 of the encoder housing 16 could be a simple or complex curve, or could comprise a series of small stepped surfaces, so long as the aligning affect described below can be accomplished by cooperation with the engagement surface of the hub 24.

Arcuate cutout portions 54 of the conical sloped surface 52 are provided opposed to one another to define part of the central opening 50 so that the cutout portions 54 of the conical surface 52 also define portions of linear passages 56 and 58 defined transversely through the encoder housing 16, as described below. The cutout portions 54 provide openings between the axial opening 50 and each passage 56 and 58. It is further understood that if only one of the passages 56 and 58 are provided to accommodate a single leg type cam, only one cutout portion 54 need be provided.

Figure 4:
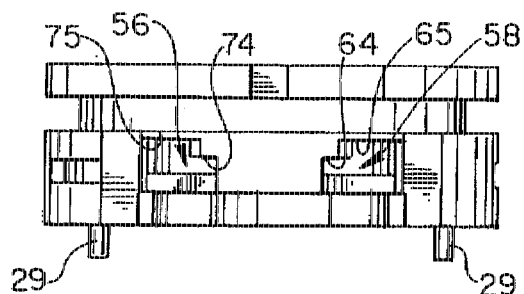
FIG. 4 is a side elevational view taken from line 4—4 of FIG. 3.
Figure 5:
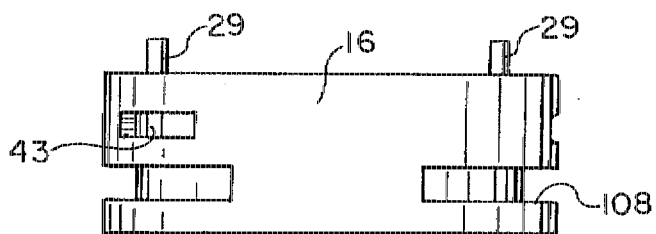
FIG. 5 is a side elevational view taken from line 5—5 of FIG. 3.

The linear passages 56 and 58 preferably are integrally formed within the housing 16 extending perpendicular to the axial direction of housing 16 and open to the outside of the housing 16 from one side, as shown in FIG. 4. Passages 56 and 58 are also preferably closed in the direction of their extension, as shown in FIG. 5.

Figure 7:
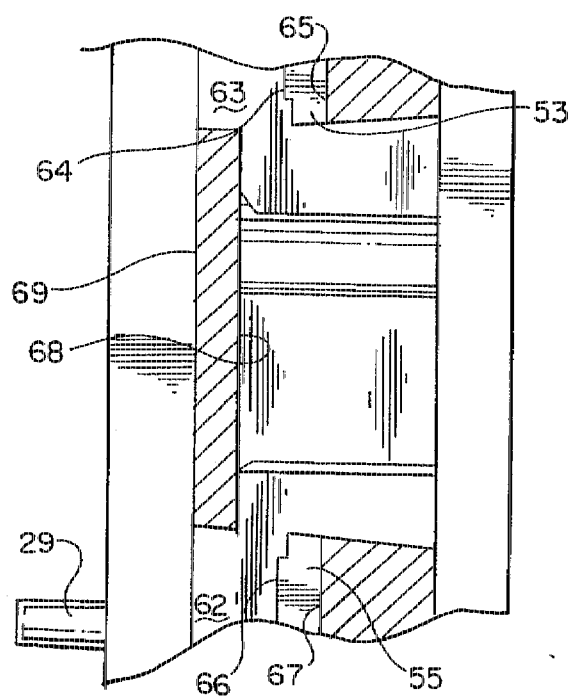
FIG. 7 is a partial cross-sectional view taken along line 7—7 of FIG. 3.
Figure 3:
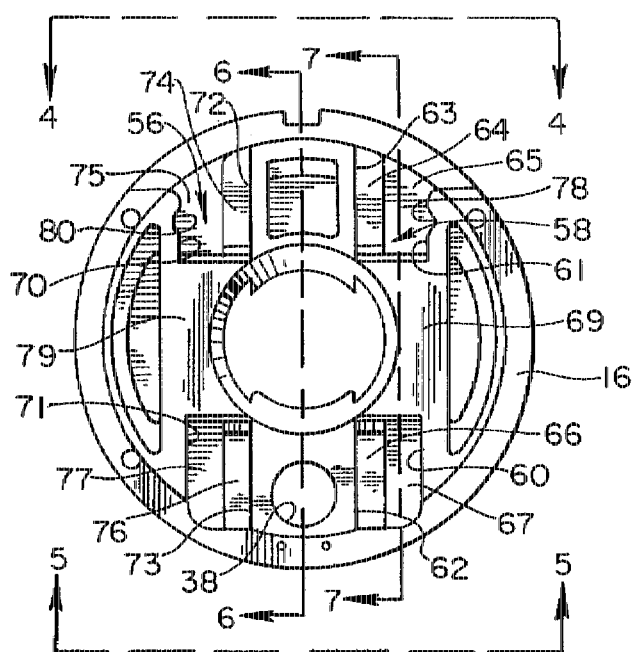
FIG. 3 is a top plan view of the encoder housing.
Figure 6:
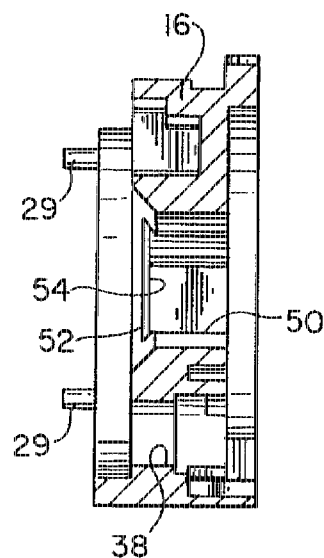
FIG. 6 is a cross-sectional view taken along line 6—6 of FIG. 3.
Figure 15:
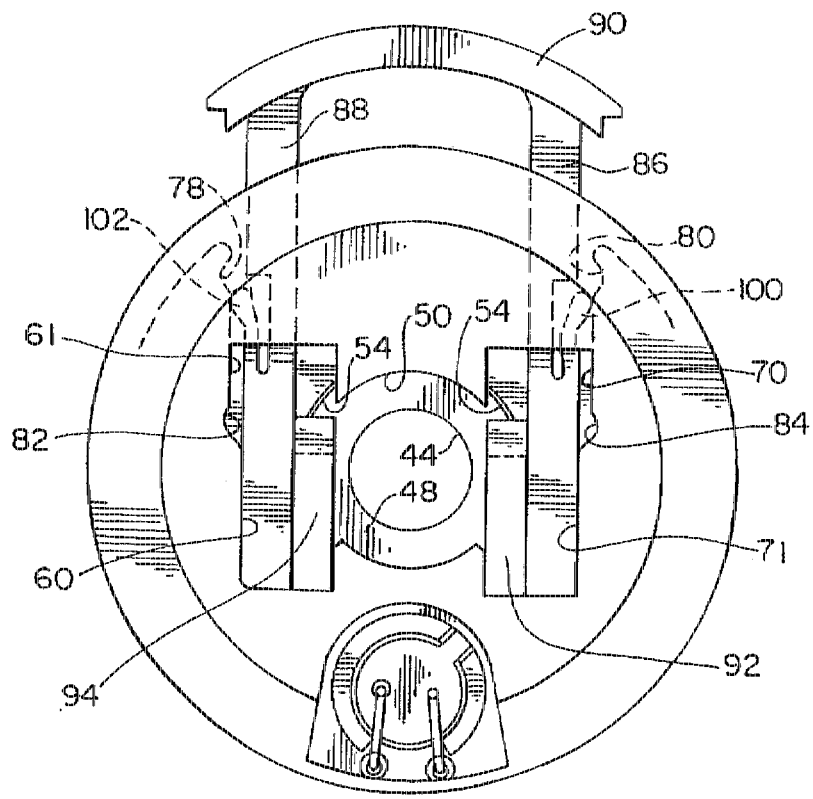
FIG. 15 is a bottom view of the assembly as shown in FIG. 13 with the linear cam in the second position.
Figure 14:
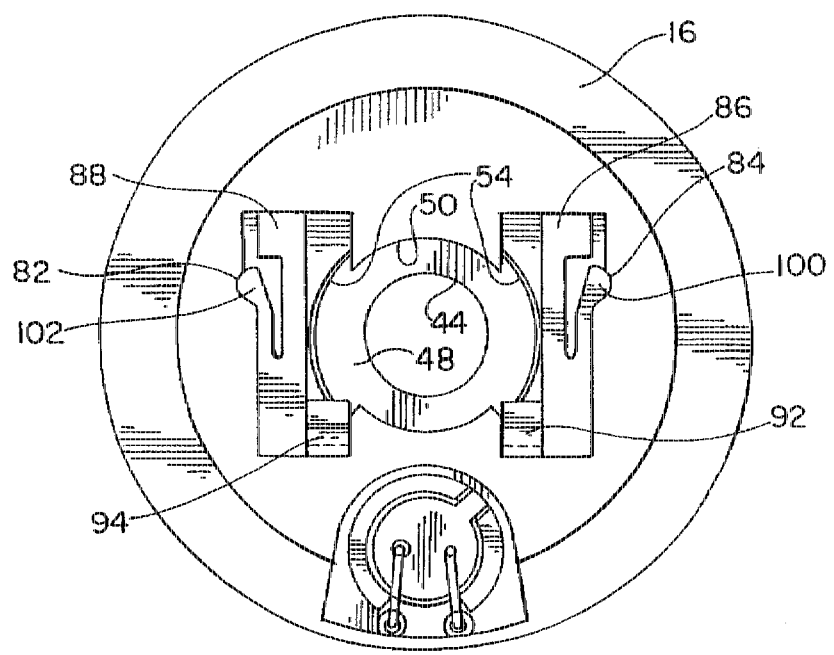
FIG. 14 is a bottom view of the assembly as shown in FIG. 12 with the linear cam in the first position.

As shown in FIGS. 3 and 7, linear passage 58 will be described with the understanding that linear passage 56 is similarly constructed, but in mirror image. A first side of the passage 58 is defined by a side wall portions 60 and 61, which, as shown from the bottom in FIGS. 14 and 15 are slightly offset from one another and connected together to from a continuous side wall by a detent recess 82, described below. A second side of the passage 58 is preferably defined by spaced side wall portions 62 and 63 with a cutout portion 54 therebetween. The dashed lines in FIG. 3 show where the sides of the passages 56 and 58 fall within the cutout portions 54 of the axial opening 50. The bottom of the passage 58 is preferably defined by a series of spaced stepped floor portions that correspond to the wall portions 62 and 63. A first stepped floor portion comprises floor surfaces 64 and 65 offset from one another by a step 53, as shown in FIG. 7. A second floor portion comprises floor surfaces 66 and 67 offset from one another by a step 55, also shown in FIG. 7. The top of passage 58 is defined in part by the lower surface 68 of a top portion 69 of the housing 16 which forms a part of the conical sloped surface 52 that is just adjacent to a cutout portion 54.

In a similar manner, the linear passage 56 is defined by a first side comprising slightly offset side wall portions 70 and 71 connected by a detent recess 84, described below, a second side comprising side wall portions 72 and 73 separated by the other cutout portion 54, a first floor portion including floor surfaces 74 and 75 offset from one another by a step 57 (see FIG. 2), a second floor portion including floor surfaces 76 and 77 offset from one another by a step 59, and a lower surface of the portion 79 of housing 16 which forms part of the conical sloped surface 52 that is adjacent the other cutout portion 54.

Side wall portions 61 and 72 are each also preferably provided with a recess at 78 and 80, respectively, near the opening of the linear passages 58 and 56, respectively, for defining a detent position of the linear cam 20, described below. As shown in FIGS. 14 and 15, the side wall portions 61 and 70 are further provided each with a second recess 82 and 84, respectively, to define another detent position of the linear cam 20, as described below.

Referring now to FIGS. 8–11, the linear cam 20 will be described in detail. The linear cam 20 basically comprises first leg 86, second leg 88, and a connecting portion 90 connected between the first and second legs 86 and 88. Connecting portion 90 is preferably arcuate and matching the outer circumference of the encoder housing 16 against which it will abut. Legs 86 and 88 extend linearly from the connecting portion 90 and are spaced from one another in accordance with the spacing of linear passages 56 and 58 of the encoder housing 16. It is contemplated that a linear cam with a single leg can instead be utilized; however, the two legs 86 and 88 are preferred to ensure an even gapping, as discussed below.

On the inside edge of leg 86 distal from connecting portion 90, a platform 92 is provided as an extension of the leg 86. Likewise, at the distal portion of leg 88 from connecting portion 90, a platform 94 is provided on the inside edge. Platforms 92 and 94 are preferably directly opposed to one another, have upper surfaces even with the upper surfaces of the legs 86 and 88, respectively, and are less than the full thickness of the legs 86 and 88. As shown best in FIGS. 8 and 9, a cam surface 96 is provided at the edge of platform 92 toward connecting portion 90 of the linear cam 20. A similar cam surface 98 is provided at the end of platform 94 toward the connecting portion 90.

Also provided, preferably about midway, along the outside edge of each of the legs 86 and 88 is a resilient detent 100 and 102, respectively. Such detents 100 and 102 formed by providing cutouts behind them in a known manner.

The legs 86 and 84 of the linear cam 20 are linearly slideable within passages 56 and 58 of the encoder housing 16. More specifically, the legs 86 and 88 of the linear cam 20 are dimensioned to fit within passages 56 and 58 with lower surfaces thereof to slide on the floor surfaces 75, 77 and 65, 67, respectively. Lower surfaces of the platforms 92 and 94 are preferably dimensioned to slide on the upper floor surfaces 74, 76 and 64, 66, respectively.

Moreover, once the linear cam 20 is positioned within the passages 56 and 58 of the encoder housing 16, the linear cam 20 is moveable between a fully inserted first detent position wherein its detents 100 and 102 are resiliently urged within recesses 82 and 84, respectively, and an extended second detent position wherein its detents 100 and 102 are resiliently urged within recesses 78 and 80. When the linear cam 20 is in the first detent position, shown from the bottom in FIG. 14, platforms 92 and 94 are positioned forward of the cutouts 54 of the conical sloped surface 52 of encoder housing 16. In the second detent position, shown in FIG. 15, platforms 92 and 94 are positioned within the cutouts 54.

Assembled and prior to application, a modular optical shaft encoder 10 in accordance with the illustrated embodiment of the present invention comprises the encoder housing 16 with the circuit board 26 fixed to its top surface with the pattern wheel 22 and hub 24 assembly loosely positioned therebetween. Mask 32 is connected to the inner surface of the circuit board 26 so as to cover the hole 30. The mask pattern is yet to be radially aligned with the pattern of the pattern wheel 22. Photodetector 34 covers hole 30 of the printed circuit board 26 from the other side thereof. The linear cam 20 is positioned with its legs 86 and 88 positioned within passages 56 and 58, respectively, of the encoder housing 16. Preferably, before installation, the linear cam is positioned in its first detent position so that platforms 92 and 94 are not positioned within the cutout portions 54 of the conical surface 52 of encoder housing 16. Light source 36 is mounted within an enlarged portion of the passage 38 of the encoder housing 16 as shown in FIGS. 12 and 13. Cover 42 may be snap fitted over the encoder housing 16.

To install the modular optical shaft encoder 10 to a shaft 12, such as that of a motor 14, the encoder 10 is slid onto the shaft 12 so that the shaft 12 passes through the central opening 50 of the encoder housing and through the axial passage 44 of hub 24. Shaft 12 may extend further through the circuit board 26 and cover 42 if appropriate. Cover 42 may be removed for easier accessibility. If the hub 24 extends sufficiently above the cover 42, when assembled, a set screw (not shown) can be provided through a threaded hole 46 located above the cover 42 so that the cover 42 need not be removed for complete installation. Proper mounting of the encoder 10 requires the radial alignment of the pattern of the pattern wheel 22 to the mask pattern on the mask 32 which is connected with the circuit board 26 and the proper spacing or gapping of the pattern wheel 22 to the mask 32 in the axial direction.

Figure 2:
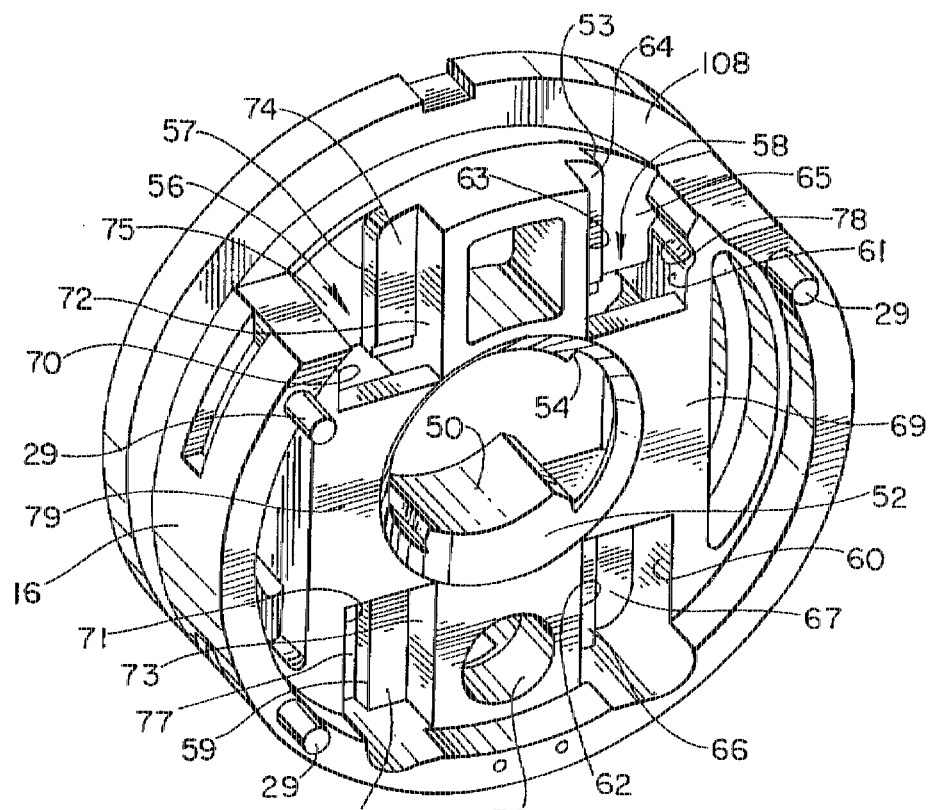
FIG. 2 is a perspective view of the encoder housing.

In accordance with the present invention, the aforementioned radial alignment is accomplished by ensuring proper radial alignment between the hub 24 and the encoder housing 16, which in turn is fixed with the circuit board 26 and mask 32. Note that the pins 29 and holes 31 provide for a specific connection orientation of the encoder housing 16 and the circuit board 26 so that the mask 32 is properly positioned relative to the passage 38 and light source 36. Once the hub 24 is slidingly engaged on the shaft 12, but not yet rotationally mounted to the shaft 12, pressure applied in a direction toward the motor 14 causes an interaction between the sloped surface 48 of hub 24 and the conical sloped surface 52 of the encoder housing 16. This interaction causes relative radial movement and thus radial alignment between the hub 24 and the encoder housing 16. Since the hub 24 is radially fixed relative to the shaft 12 when it is slid thereon, the radial alignment must be done before the encoder housing 16 is fixed to the surface 18 of the motor 14. Moreover, the application of pressure on hub 24 toward the motor 14, in order to attain radial alignment, must be done while the linear cam 20 is in its first position; that is with the platforms 92 and 94 not interfering with the contact between the sloped surface 48 of hub 24 and the conical surface 52 of the encoder housing 16. Once radial alignment has been achieved, the encoder housing 16 is mounted to the surface 18 of the motor 14. According to the illustrated embodiment, a servo flange 108, see FIG. 2, is clamped to the motor housing by a conventional servo cleat (not shown), which is in turn connected to the motor surface 18. However, simple holes through the encoder housing and screws could be used, provided that a sufficient clearance or play is provided within the encoder housing holes to allow the radial alignment and mounting. In effect, the mask pattern of the mask 32 is now radially aligned with the pattern of the pattern wheel 22.

The next step is to axially gap the pattern wheel 22 and mask 32. To do this, the linear cam 20 is moved from its first detent position to its second detent position, as shown in FIG. 13. In approaching this position, cam surfaces 96 and 98 of platforms 92 and 94, respectively, engage portions of the sloped surface 48 of hub 24. Continued movement towards the second detent position raises the hub 24 and hence pattern wheel 22 from contact with the conical surface 52 of the encoder housing 16. When the linear cam 20 is fully moved to its second detent position, platforms 92 and 94 are positioned under the bottom surface of the hub 24, see FIG. 15, and the hub 24 and pattern wheel 22 are lifted to a proper gapping position relative to the mask 32.

Then, with the linear cam 20 in its second detent position, the hub 24 can be fixed to rotate with the shaft 12, such as by tightening a set screw (not shown) through the threaded hold 46 for locking the hub 24 in axial position along shaft 12. At this point, radial and axial alignment of pattern wheel 22 relative to the mask 32 is complete. After this, the linear cam 20 can be moved back to its first detent position without consequence. Cover 42, if removed, can now be applied over the encoder housing 16 and the modular optical shaft encoder 10 is appropriately mounted.

What is claimed is:

1. An optical modular shaft encoder for mounting on a rotatable shaft and its supporting structure, comprising:

an encoder housing for connection to the supporting structure of the rotatable shaft so as to be non-rotatably mounted relative to the shaft, said encoder housing having an opening through which the shaft extends when connected to the supporting structure and a radial alignment sloped surface extending at least partially around said opening;

a light source connected to said encoder housing so as to be non-rotatably mounted with the supporting structure relative to the shaft;

a photodetector axially spaced from said light source and connected to said encoder housing so as to be non-rotatably mounted with the supporting structure relative to the shaft;

a mask having a mask pattern, said mask positioned axially between said light source and said photodetector and connected to said encoder housing so as to be non-rotatably mounted with the supporting structure relative to the shaft; and a pattern wheel including a hub having an axial passage for slideably receiving the shaft and for mounting the hub to the shaft to be rotatable therewith and a radially extending surface having an optical pattern thereon, said radially extending surface axially positioned between said light source and said mask, said hub having a radial alignment sloped surface extending at least partially around said axial passage and positioned to engage with said radial alignment surface of said encoder housing, whereby, when said encoder housing is unconnected to the supporting structure of the rotatable shaft but positioned with the rotatable shaft extending through its opening and said hub of said pattern wheel is slideably provided on the rotatable shaft, and further when said hub is moved along the shaft toward the encoder housing, the radial alignment sloped surfaces of said encoder housing and said hub of the pattern wheel will engage one another to cause radial alignment of said optical pattern of said pattern wheel to the mask pattern of said mask.

2. The encoder of claim 1, wherein said hub comprises a flange portion having said radial alignment sloped surface thereon and which extends completely around said hub to form a truncated cone.

3. The encoder of claim 2, wherein said radial alignment sloped surface of said encoder housing has a similar slope as that of the radial alignment sloped surface of said hub so that a portion of said hub extends within said opening of said encoder housing when said radial alignment sloped surfaces are engaged with one another.

4. The encoder of claim 1, wherein at least one transverse passage is provided within said encoder housing that opens into said opening, and further including a linear cam element having a platform portion, said linear cam being movably disposed within said transverse passage of said encoder housing between a first position in which said platform is positioned within said transverse passage but out of said opening of said encoder housing so that the radial alignment surfaces of said hub and said encoder housing can contact one another and a second position in which at least a part of said platform portion extends within said axial opening of said encoder housing for engagement with said hub so as to space the radial alignment surfaces of said hub and said encoder housing from one another.

5. The encoder of claim 4, further including a second transverse passage provided within said encoder housing that also opens into said opening, and wherein said linear cam element comprises two substantially parallel leg portions connected together to move as a unit, each having a platform portion, said leg portions being movably disposed within said transverse passages of said encoder housing between first positions in which each platform is positioned within a transverse passage but out of said opening of said encoder housing so that the radial alignment surfaces of said hub and said encoder housing can contact one another and a second position in which at least a part of each platform portion extends within said opening of said encoder housing for engagement with said hub so as to space the radial alignment surfaces of said hub and said encoder housing from one another.

6. The encoder of claim 5, further comprising a cam surface at an edge of each platform portion for engaging with and moving said hub from its position of engagement with said encoder housing to its spaced position as said linear cam element is moved from its first position to its second position.

7. The encoder of claim 6, wherein at least one of the transverse passages within said encoder housing also includes plural recesses formed in wall portions thereof and at least one leg of said linear cam element includes a resilient detent for engaging within said plural recesses to define said first and second positions of said linear cam element.

8. The encoder of claim 7, further including a circuit board mounted to said encoder housing so as to be non-rotational therewith and having said mask mounted on a surface thereof over a hole passing through said circuit board and over which on the other side of said circuit board said photodetector is mounted.

9. The encoder of claim 8, wherein said light source is mounted to said encoder housing within an axial passage.

10. An optical modular shaft encoder for mounting on a rotatable shaft and its supporting structure, comprising:

an encoder housing for connection to the supporting structure of the rotatable shaft so as to be non-rotatably mounted relative to the shaft, said encoder housing having an axial opening through which the shaft extends when connected to the supporting structure, an engagement surface extending at least partially around said axial opening and at least one transverse passage that opens into said axial opening;

a light source connected to said encoder housing so as to be non-rotatably mounted with the supporting structure relative to the shaft;

a photodetector axially spaced from said light source and connected to said encoder housing so as to be non-rotatably mounted with the supporting structure relative to the shaft;

a mask having a mask pattern, said mask positioned axially between said light source and said photodetector and connected to said encoder housing so as to be non-rotatably mounted with the supporting structure relative to the shaft;

a pattern wheel including a hub having an axial passage for slideably receiving the shaft and for mounting the hub to the shaft to be rotatable therewith and a radially extending surface having an optical pattern thereon, said radially extending surface axially positioned between said light source and said mask, said hub having an engagement surface extending at least partially around said axial passage and positioned to engage with said engagement surface of said encoder housing; and a linear cam element having a platform portion, said linear cam being movably disposed within said transverse passage of said encoder housing between a first position in which said platform is positioned within said transverse passage but out of said axial opening of said encoder housing so that the engagement surfaces of said hub and said encoder housing can contact one another and a second position in which at least a part of said platform portion extends within said axial opening of said encoder housing for engagement with said hub so as to space the engagement surfaces of said hub and said encoder housing from one another.

11. The encoder of claim 10, further including a second transverse passage provided within said encoder housing that also opens into said axial opening, and wherein said linear cam element comprises two substantially parallel leg portions connected together to move as a unit, each having a platform portion, said leg portions being movably disposed within said transverse passages of said encoder housing between first positions in which each platform is positioned within a transverse passage but out of said axial opening of said encoder housing so that the engagement surfaces of said hub and said encoder housing can contact one another and a second position in which at least a part of each platform portion extends within said axial opening of said encoder housing for engagement with said hub so as to space the engagement surfaces of said hub and said encoder housing from one another.

12. The encoder of claim 11, further comprising a cam surface at an edge of each platform portion for engaging with and moving said hub from its position of engagement with said encoder housing to its spaced position as said linear cam element is moved from its first position to its second position.

13. The encoder of claim 12, wherein at least one of the transverse passages within said encoder housing also includes plural recesses formed in wall portions thereof and at least one leg of said linear cam element includes a resilient detent for engaging within said plural recesses to define said first and second positions of said linear cam element.

14. The encoder of claim 13, further including a circuit board mounted to said encoder housing so as to be non-rotational therewith and having said mask mounted on a surface thereof over a hole passing through said circuit board and over which on the other side of said circuit board said photodetector is mounted.

15. The encoder of claim 14, wherein said light source is mounted to said encoder housing within an axial passage.

16. The encoder of claim 10, wherein said engagement surfaces of said hub and said encoder housing comprise radial alignment sloped surfaces so that when said encoder housing is unconnected to the supporting structure of the rotatable shaft but positioned with the rotatable shaft extending through its opening and said hub of said pattern wheel is slideably provided on the rotatable shaft, and further when said hub is moved along the shaft toward the encoder housing, the radial alignment sloped surfaces of said encoder housing and said hub of the pattern wheel will engage one another to cause radial alignment of said optical pattern of said pattern wheel to the mask pattern of said mask.

17. The encoder of claim 16, wherein said hub comprises a flange portion having said radial alignment sloped surface thereon and which extends completely around said hub to form a truncated cone.

18. The encoder of claim 17, wherein said radial alignment sloped surface of said encoder housing has a similar slope as that of the radial alignment sloped surface of said hub so that a portion of said hub extends within said opening of said encoder housing when said radial alignment sloped surfaces are engaged with one another.

19. A method of mounting and aligning a modular encoder to a rotatable shaft of the type having a supporting structure, the encoder having an encoder housing with an axial opening and a radial alignment sloped surface extending at least partially around the opening, a light source connected to the encoder housing, a photodetector axially spaced from the light source and connected to the encoder housing, a mask having a mask pattern, the mask positioned axially between the light source and the photodetector, and a pattern wheel including a hub having an axial passage and a radially extending surface having an optical pattern thereon, the radially extending surface axially positioned between the light source and the mask, the hub having a radial alignment sloped surface extending at least partially around the axial passage and positioned to engage with the radial alignment surface of the encoder housing, said method comprising the steps of:

positioning the modular encoder on the rotatable shaft with the shaft extending through the axial opening of the encoder housing and the axial passage of the hub;

urging the hub and encoder housing toward the supporting structure of the rotatable shaft and engaging the radial alignment surfaces of the encoder housing and the hub with one another and thereby causing radial alignment of the optical pattern of the pattern wheel to the mask pattern of the mask; and mounting the encoder housing to the supporting structure of the rotatable shaft with the optical pattern of the pattern wheel radially aligned to the mask pattern of the mask.

20. The method of claim 19, further including the steps of: gapping the pattern wheel with respect to the mask after the step of mounting the encoder housing by moving the hub away from the encoder body by a predetermined distance and connecting the hub to the rotatable shaft to be rotatable therewith at the predetermined distance.

21. The method of claim 20, wherein said gapping step further comprises moving a linear cam element between first and second positions within a transverse passage that is provided within the encoder body and is open to the axial opening thereof, wherein the linear cam element includes a platform which is moved from a position within the transverse passage but out of the axial opening to a position at least partially within the axial opening as the linear cam element is moved from its first position to its second position.

* * * * *